(12) United States Patent
Powell et al.

(10) Patent No.: US 11,306,837 B1
(45) Date of Patent: Apr. 19, 2022

(54) SAFETY VALVE FOR HOT WATER HEATER

(71) Applicant: JDP W.H.A.T. LTD, Las Vegas, NV (US)

(72) Inventors: Joel Thomas Powell, Las Vegas, NV (US); Daniel Steven Nielson, Las Vegas, NV (US)

(73) Assignee: JDP W.H.A.T., Ltd., Las Vegas, NV (US)

( * ) Notice: Subject to any disclaimer, the term of this patent is extended or adjusted under 35 U.S.C. 154(b) by 0 days.

(21) Appl. No.: 17/138,389

(22) Filed: Dec. 30, 2020

(51) Int. Cl.
| F16K 17/04 | (2006.01) |
| F24H 9/20 | (2022.01) |
| F16K 17/02 | (2006.01) |
| F16K 17/196 | (2006.01) |
| F16K 17/22 | (2006.01) |
| F16K 17/08 | (2006.01) |

(52) U.S. Cl.
CPC .......... *F16K 17/04* (2013.01); *F16K 17/0466* (2013.01); *F16K 17/02* (2013.01); *F16K 17/082* (2013.01); *F16K 17/196* (2013.01); *F16K 17/22* (2013.01); *F24H 9/2007* (2013.01)

(58) Field of Classification Search
CPC .... F24H 9/2007; F16K 17/0466; F16K 17/04; F16K 17/082; F16K 17/22; F16K 17/196; F16K 17/02
USPC ........................ 122/14.31; 137/391, 453, 487
See application file for complete search history.

(56) References Cited

U.S. PATENT DOCUMENTS

| 2,766,126 | A |   | 3/1957 | Kendon |
| 3,097,664 | A | * | 7/1963 | Henley ..................... G05D 7/03 137/487 |
| 3,302,391 | A |   | 2/1967 | Mihm |
| 3,712,327 | A | * | 1/1973 | Pagenkopf ................ F17D 5/00 137/78.2 |
| 3,754,563 | A | * | 8/1973 | Boals ...................... F24H 9/124 137/94 |
| 4,607,615 | A | * | 8/1986 | Boals .................... F24H 9/2007 122/14.1 |
| 6,021,808 | A |   | 2/2000 | Dulac |

(Continued)

FOREIGN PATENT DOCUMENTS

| GB | 365497 A | 10/1980 |
| JP | 10075911 A1 | 3/1998 |

(Continued)

*Primary Examiner* — Steven B McAllister
*Assistant Examiner* — Benjamin W Johnson
(74) *Attorney, Agent, or Firm* — Hartman Titus PLC; John D. Titus (57) ABSTRACT

A pressure actuated water shutoff valve is presented. The shutoff valve comprises an upper housing and a lower housing where the upper housing is coupled to the lower housing. The lower housing has a water inlet and a water outlet with a flow passage therebetween. The lower housing includes a plunger seat configured to receive a shutoff plunger. The upper housing includes an chamber having a piston bore in which reciprocates an piston, coupled to the shutoff plunger. In response to a first pressure condition, the piston lifts the shutoff plunger off its seat allowing water to flow through the lower housing. In response to a second pressure condition, a biasing spring seals the plunger against its seat, shutting off water flow through the valve.

8 Claims, 4 Drawing Sheets

(56) References Cited

U.S. PATENT DOCUMENTS 6,823,887 B2 * 11/2004 Dulac .................... F24H 9/126
137/334

FOREIGN PATENT DOCUMENTS

| JP | 2006336900 A | 12/2006 |
|----|--------------|---------|
| JP | 2010085012 A | 4/2010  |

* cited by examiner

SAFETY VALVE FOR HOT WATER HEATER

BACKGROUND OF THE INVENTION

Field of the Invention

The present invention relates to hot water heating systems and, more particularly, to a cold water shutoff valve for use with tank style hot water heaters, where the valve will shut off the incoming cold water flow in the event of a pressure loss in the tank, such as when the hot water task ruptures or otherwise develops a leak.

BACKGROUND ART

Hot water heaters axe used in a wide variety of applications including residential homes, as well as commercial buildings. In residences, hot water heaters provide heated water for washing and bathing. Most such hot water heaters are tank style heaters that typically include a relatively large tubular hot water tank, a cold water supply line for supplying cold water to the tank, an electrical or gas fired heating unit disposed within the tank which operates to heat the cold water supplied to the tank, and a hot water outlet line for supplying the heated water to various areas of a home or building.

When hot water is drawn off through the outlet line it is continuously replaced with cold water from the cold water supply line so as to maintain the water level in the tank. If the tank ruptures or otherwise springs a leak, the water leaking from the rank will be continuously replaced, and the leak will continue until the flow of water through the inlet supply line is stopped. Usually this can only be achieved by turning the water supply off at its connection to the building main line. This system is adequate where the leak is recognized quickly.

Water heaters, whether in residential or commercial buildings, are susceptible to tank rupture, i.e. failure in a manner where the water within the heater and water entering the heater will leak uncontrollably onto the underlying floor. Very large volumes of water can leak from a hot water system in a relatively short time where a leak remains undetected. Such flooding could cause extensive damage to the building and its contents. Moreover, uncontrolled leakage of water from a ruptured hot water heater wastes water, which, in many areas, is becoming an increasingly precious resource.

Systems for sensing a leak in a hot water heater and automatically turning off j the cold water supply line are known in the an. One type of such leak detection and control system employs flow monitoring sensors intended to discriminate between normal water flow and abnormal flows attributable to leaks. Such systems monitor either instantaneous flaw or flows over a limed period, and send an electrical control signal to a shut-off valve. Other types of leak control systems use a float-activated electrical switch positioned in a water accumulating chamber to control an electrically actuated valve.

The above-described water shut-off systems usually involve processor controlled electrical equipment, which may fail to operate in the event of a loss of electrical power or where, for example, a vacationing homeowner has shutoff power to his or her residence. These processor controlled systems are also relatively expensive to manufacture and are difficult to retrofit to existing hot water heater installations.

As may be appreciated, there is a need in the art for a cold water shutoff valve for hot water heaters that is reliable, does not require electrical power to operate and is relatively easy and cost effective to retrofit to existing hot water heater installations. Such a valve would reduce or prevent property damage in the event of a tank rupture or other serious teak and would conserve water, an increasingly precious resource.

SUMMARY OF THE INVENTION

The present invention safety shut off valve meets a long-felt need in the art try providing a mechanically operated water shut off valve that operates in response to changes in air pressure. The shutoff valve of the present invention is ideal tor use as a cold water shutoff valve with tank-style hot water heaters as the valve will operate in response to changes in air pressure inside the hot water tank. Moreover, the valve may be readily installed in existing hot water heater installations at relatively low cost. Being a purely mechanical device, the shutoff valve does not require electricity to operate. With widespread adoption, the water shutoff valve of the present invention has the potential to save millions of gallons of water per year.

The safety shutoff valve of the present invention is described in the exemplary embodiment with respect to use with tank style hot water heaters which develop pressure in the air space above the water level of the tank. Therefore, in this type of installation, the valve is responsive to air pressure. In other types of hot water heater installations, the safety shutoff valve of the present invention may be responsive to water pressure.

Although the safety shutoff valve of the present invention is expected to have immediate practical application in hot water heater installations, the valve is not limited to use with hot water heaters. More generally, the safety shutoff valve of the present invention may be employed in any industrial or agricultural application where it is desired to shut off the flow of a gas or fluid in response to a change in pressure of another gas or fluid.

The present invention safety shutoff valve is a cold water shut off valve that stops incoming cold water flow to a hot water heater in the event of a tank failure. The shutoff valve makes use of the fact that, in a typical tank-style hot water heater, at no time is the tank completely full of water. At all times, me tank is only partially full of water and a volume of air occupies the space above the water in the tank. As cold water in a tank is heated, air pressure in the tank rises. Hot water heaters include a pressure relief valve to vent the hot water tank to atmosphere in the event of an overpressure condition within the tank.

Typical residential hot water heaters are set to maintain water at a user specified temperature within the range of about 110 to 170 degrees Fahrenheit. (The EPA recommended setting for residential hot water hearers is 120 degrees.) This temperature range corresponds to operating air pressures within the tank in the range of about 53 IO 90 psi. The safety shutoff valve of the present invention is configured to operate in a fully open condition within this pressure range.

When air pressure in the hot water tank drops below the 55-90 psi operating range, the safety shutoff valve of the present invention closes. In the event of a tank rupture, air pressure in the tank drops precipitously, and the safety shut off valve will rapidly close. Any significant leak in the hot water tank or hot water outlet line will cause tank pressure to drop and thereby the valve will actuate, i.e. shutoff the inlet flow of cold water. In the event the hot water hearer is turned off, the safety shut off valve will slowly close as the water in the tank cools and air pressure in the tank drops accordingly. The safety shutoff valve will also shut off the inlet water flow when the hot water heater is drained or in the event of a heat source failure.

In the event of a planned shutoff of the hot water heater or an inadvertent shutoff which does not compromise the hot water tank's integrity, the safety shutoff valve may be manually opened via a lever at the top of the device. In a situation where a hot water has simply been turned off for a period of time and the tank remains full of water, the safety shutoff valve of the present invention will automatically reset when air pressure within the tank again enters into is normal operating range, i.e. typically about 55-90 psi.

The safety shutoff valve of the present invention comprises, generally, an upper housing and a lower housing where the upper housing is removably coupled to the lower housing. The lower housing has a water inlet and a water outlet with a flow passage therebetween. Formed into the flow passage is a plunger seat configured to receive a shutoff plunger. The upper housing includes a piston bore within which moves a piston. The upper housing also includes a plunger bore disposed below the piston bore. A lower end of the upper housing is attachable to the lower housing.

When the upper and lower housings are coupled, the plunger bore is in fluid communication with the flow passage of the lower housing. Under normal operating conditions, a shutoff plunger resides in the plunger bore of the upper housing. The shutoff plunger is movable between an open position in the plunger bore of the upper housing and a closed position against the plunger seat in the lower housing. When in the closed position, tire shutoff plunger prevents water from flowing through the valve.

The piston bore of the upper housing is divided by the piston into a chamber defined as the region of the piston bore below the piston and a spring housing defined as that region of the piston bore above the piston. The biasing spring is disposed in the spring housing between the piston and an adjustable cap which closes out the spring housing.

The chamber is coupled to the air volume of a hot water tank via a coupling line installed in a line between the air volume of a hot water tank and a pressure relief valve of the hot water tank. The piston is physically coupled to the plunger by means of a common operating rod. The operating rod extends from the adjustable cap which closes out the upper housing and has a reset lever attached thereto. The reset lever is configured to have an open and a closed position, as well as a reset position.

As the chamber of the upper housing is fluidly coupled to the air volume of the hot water tank, i.e. sees air pressure from the tank, the safety shutoff valve of the present invention is responsive to change in lux water tank pressure. The biasing spring of the shutoff valve is sized such that when the tank is at normal operating pressure, the piston moves upwardly against the biasing spring and compresses the spring such that the plunger lifts off the plunger seat and allows cold water to flow through the flow passage of the lower housing and into the hot water tank. i.e. the shutoff valve is in the open position.

In the event of a catastrophic failure where the tank is compromised, air pressure in the hot water tank drops rapidly (to atmosphere pressure) and thus air pressure in the chamber which is fluidly coupled to the tank drops rapidly was well. With a loss of tank pressure, the piston no longer applies force to, i.e. compresses the biasing spring, and thus the biasing spring drives the piston downwardly. The plunger being coupled to the piston via the operating rod, likewise moves downwardly and seals against the plunger seat in the lower housing shutting of water flow through the valve.

In other situations, for example, where the hot water is full but cold, or empty, air pressure in the tank is at nominal, i.e. atmospheric pressure, and the biasing spring maintains the plunger in its closed position, sealed against the plunger seat, thereby preventing water flow through the valve.

The reset lever of the shutoff valve, when actuated, will lift the plunger off its seat thereby allowing water to flow though the shutoff valve when the hot water heater is cold. The reset lever, resets to a fully open position when water in the tank is heated which thereby raises air pressure in the air volume above the tank and consequently in the chamber of the shutoff valve.

With widespread adoption, the water shutoff valve of the present invention has the potential to conserve a substantial amount of water that would otherwise be lost. It is estimated that, on the average, 11 gallons per minute are lost when a typical tank-style residential hot water heater ruptures. According to energystar.com, over 9 million water heaters are sold in the United States each year. Statistic as to how many hot water heaters rupture each year are difficult to estimate. It is reasonable to assume however, that a substantial percentage of the 9 million hot waters heaters sold each year are to replace foiled hot water heaters. The chart below illustrates how much water may be lost each year and thus can be potentially saved, given specific time periods from rupture to cold water shutoff.

| Water Heaters Ruptured per Year | Gallons Lost in One Minute | Gallons Lost in 30 Minutes | Gallons Lost in 60 Minutes | Gallons Lost in 180 Minutes |
| --- | --- | --- | --- | --- |
| 1 million | 11,000,000 | 330,000,000 | 660,000,000 | 1,980,000,000 |
| 2 million | 22,000,000 | 660,000,000 | 1,320,000,000 | 3,960,000,000 |
| 3 million | 33,000,000 | 990,000,000 | 1,980,000,000 | 5,940,000,000 |
| 5 million | 55,000,000 | 1,650,000,000 | 3,300,000,000 | 9,900,000,000 |
| 7 million | 77,000,000 | 2,310,000,000 | 4,620,000,000 | 13,860,000,000 |
| 9 million | 99,000,000 | 2,970,000,000 | 5,940,000,000 | 17,820,000,000 |

The above and other advantages of the water shutoff valve of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Description of the Component Parts

Figure 1:
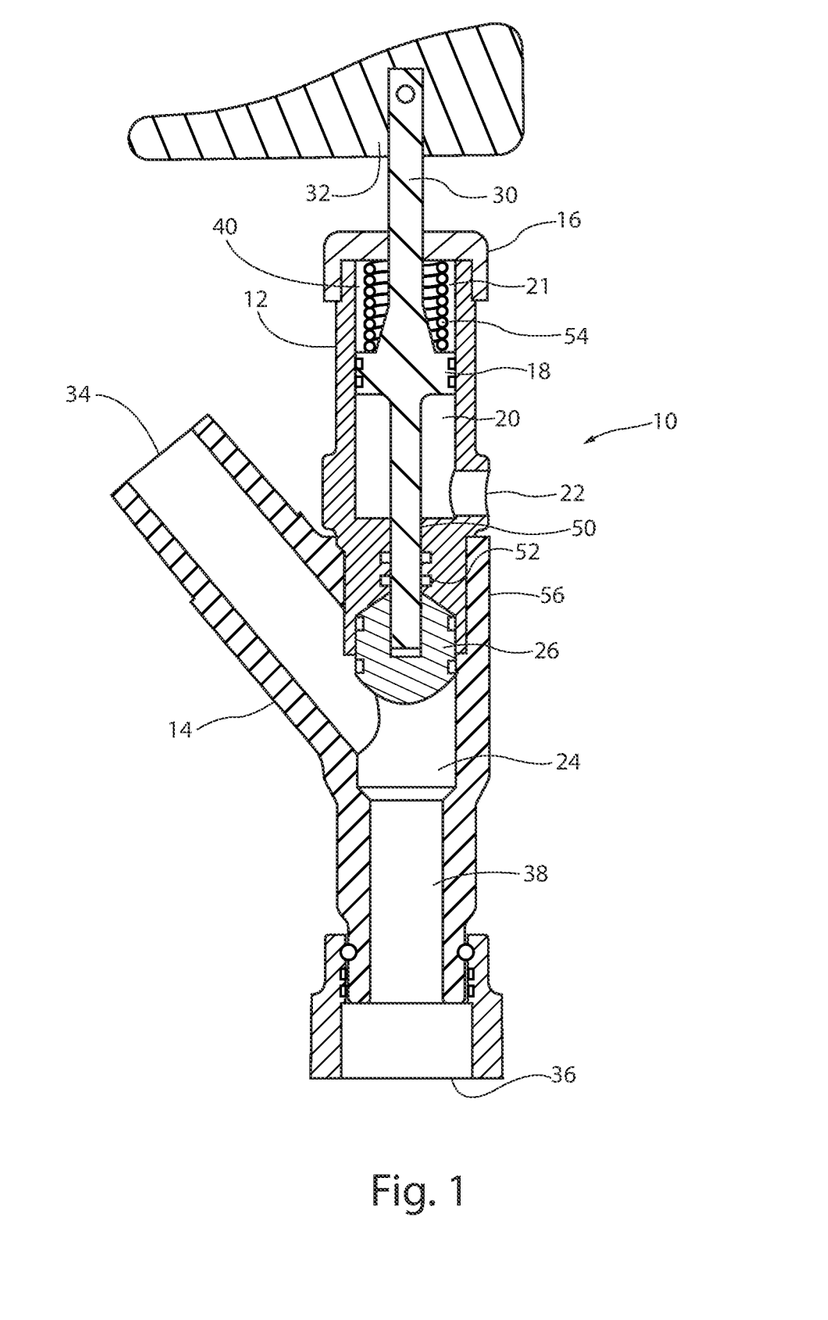
FIG. 1 is a schematic view of the shutoff valve of the present invention showing the valve in its open condition.
Figure 2:
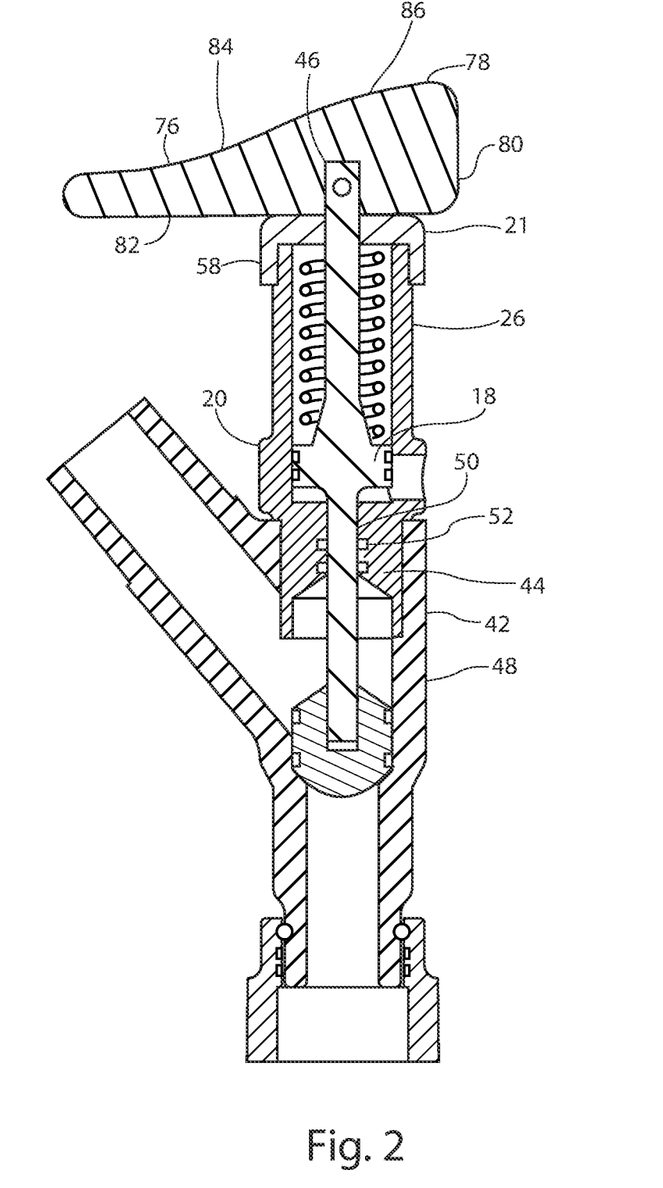
FIG. 2 is a schematic view of the shutoff valve of the present invention showing the valve in its closed condition.

With reference to FIGS. 1-2, in the exemplary embodiment, the shutoff valve 10 of the present invention comprises an upper housing 12 and a lower housing 14. The upper housing 12 is coupled to the lower housing 14. The lower housing 14 has a water inlet 34 and a water outlet 36 with a flow passage 38 formed therebetween. Formed in the flow passage 38 is a plunger seat 24, which is configured to receive a shutoff plunger 26.

The upper housing 12 includes a piston bore 40, a plunger bore 42 (best shown in FIG. 3) and a separation wall 44 therebetween. The piston bore 40 and the plunger bore 42 are axially aligned. Disposed within the piston bore 40 is a piston (also referred to as a movable piston) 18 which is moveable, i.e. reciprocates, within the bore 40. The piston bore 40 is divided by the piston 18 into two regions of variable volume. The region of variable volume below the piston 18 defines a chamber (also referred to as an chandler) 20 and region of variable volume above the piston 18 defines a spring housing 21. The spring housing 21 is closed out by a cap 16. Disposed within the spring housing 21, between the piston 18 and the cap 16, is a biasing spring 34. The chamber 20 includes a port 22 for sensing pressure, which, when the shutoff valve 10 is installed in a hot water installation, is the pressure in an air volume 68 (see FIG. 4) of a tank-style hot water heater.

The piston 18 is coupled at a predetermined position approximately midway between an upper end 46 and a lower end 48 of an operating rod 30. The shutoff plunger 26 is coupled to the lower end 48 of the operating rod 30. With the piston 18 and the shutoff plunger 26 both being coupled to the operating rod 30, the piston 18 and shutoff plunger are constrained to move in tandem, i.e. to move together.

The lower end 48 of the operating rod 30 passes through a bore 50 in the separation wall 44 of the upper housing 12. In the exemplary embodiment the gap between the operating rod 30 and the bore 50 is sealed against water intrusion into the chamber 20, by means of o-ring seals 52. Other types of seals are also suitable and are known in the art.

Figure 3:
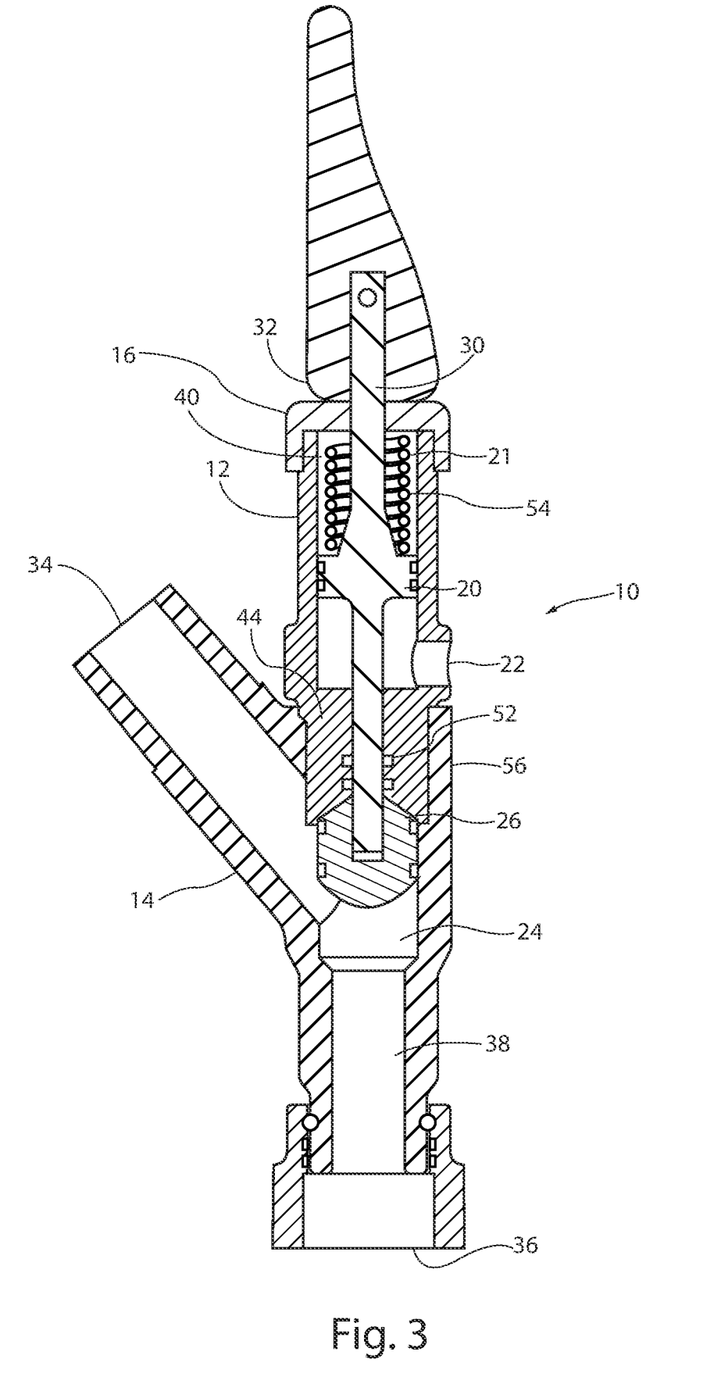
FIG. 3 is a schematic view of the shutoff valve of the present invention showing the valve in its reset condition.

The upper end 46 of the operating rod 30 extends outwardly from the adjustable cap 16 which closes out the spring housing 21. A reset lever 32 is pinned, i.e. is rotateably attached to, an end of the operating rod 30 which extends outwardly from the adjustable cap 16. The react lever 32 is configured to have an open, a closed, and a reset position. FIGS. 1, 2 and 3 depict the reset lever 32 in its open, closed and reset positions, respectively.

When the upper housing 12 and the lower housing 14 are coupled, the plunger bore 42 is in fluid communication with the flow passage 38 of the lower housing 14 and is movable via the operating rod 30 between a closed position where the shutoff plunger 26 is seated on the plunger seat 24 of the lower housing 14 (see FIG. 2) and an open position where the shutoff plunger abuts an end of the plunger bore 42 of the upper housing 12. (See FIG. 1.) When in the closed position, the shutoff plunger 26 prevents water from flowing through the shutoff valve 10 and, when in the open position allows water to flow through the shutoff valve 10.

In the exemplary embodiment of the water shutoff valve 1, the upper and lower housings 12 and 14, end cap 16, operating rod 30, piston 18, shutoff plunger 26 and reset lever 32 are made of plastic materials. The biasing spring 54 is made from steel. The upper and lower housings 12 and 14 are coupled by means of a screw thread joint 56. Likewise, the end cap 16 is coupled to the upper housing 12 by means a screw thread joint 58. The joints between components are sealed against water intrusion or air leakage by means of o-ring seals. Other materials such as metallic materials are also suitable for the component parts, as are other means of joining the parts. For example, the component parts may be joined by means of press flu, adhesives, ultrasonic welding techniques in the case of plastic materials and conventional welding techniques in the case of metallic materials.

Installation of the Water Shutoff Valve in a Hot Water Heating System

Figure 4:
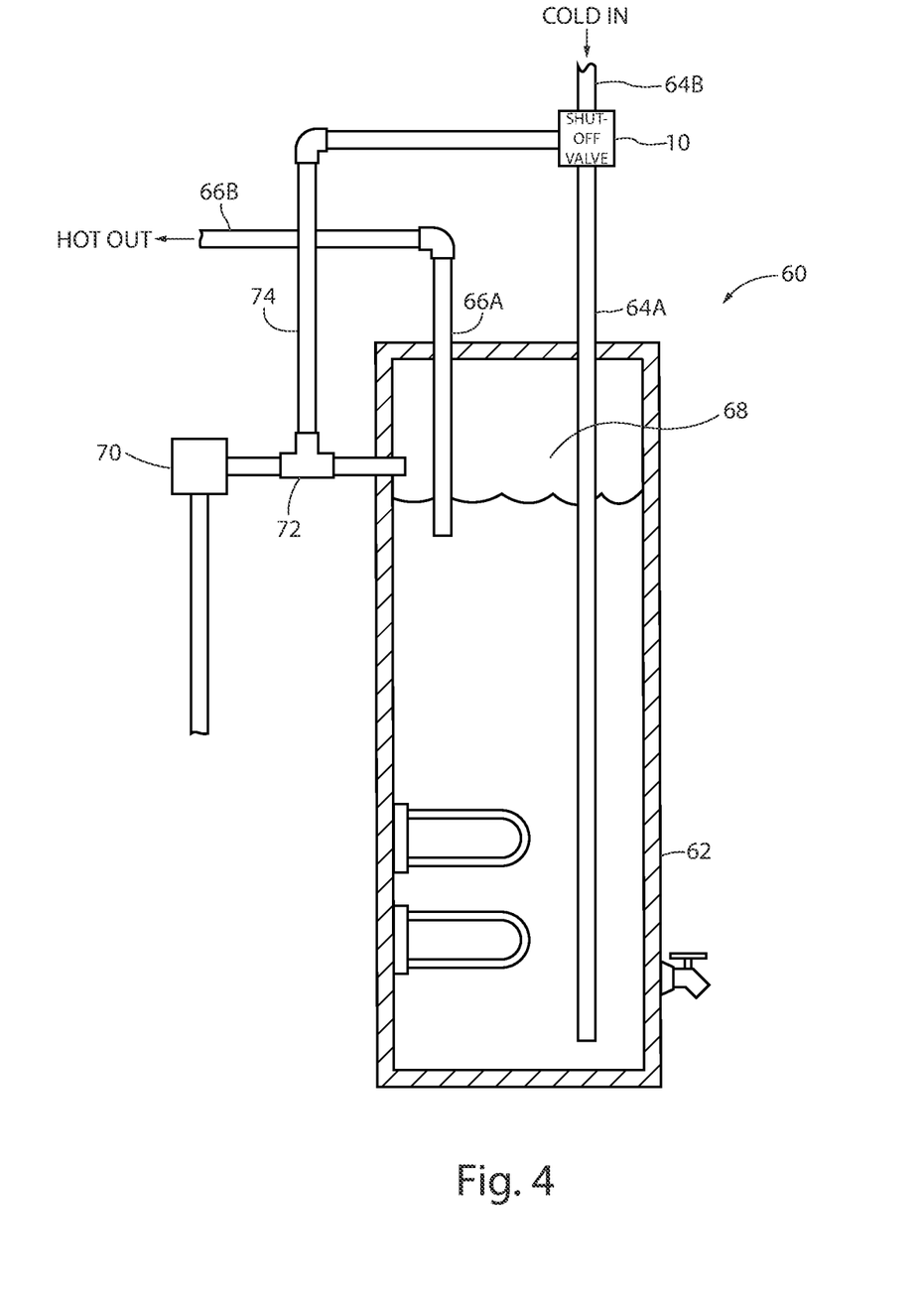
FIG. 4 is a schematic view of the shutoff valve of the present invention installed with a tank-style hot water heater.

The water shutoff valve 10 of the present invention is suitable for installation in both electric and gas heated tank-style hot water heaters. With reference to FIG. 4, a representative tank-style hot water heater 60 is shown. The hot water heater 60 will typically include a hot water tank 62 having a cold water inlet 64A and a hot water outlet 66A. A cold water supply line 64B from a residence's main line and a hot water output line 66B which supplies hot water for distribution to kitchens and bathrooms in a residence are also part of a typical tank-style hot water heater installation.

Tank-style hot water heaters are designed to operate with the hot water tank 62 only partially toll, leaving an air volume 68 above the water level of the tank. As cold water in the tank is heated, air pressure in the tank rises. Therefore, hot water heaters include a pressure relief valve 70 to vent the hot water tank 62 to atmosphere in the event of an overpressure condition within the tank.

Installation of the water shutoff valve 10 of the present invention for use with a tank-style hot water heater is straight forward and can be readily be accomplished by a trained installer or a skilled home handyman with a minimum of lime and effort. To perform the installation, the shutoff valve 10 is installed between the cold water supply line 64B and the cold water inlet of the tank 64A. That is, the cold water supply line 64B is connected to the water inlet 34 of the lower housing 14 and the water outlet 36 of the lower housing 14 is connected to the cold water inlet 64A of the hot water heater 60. Procedures for the installation of valves in water lines are well known and those skilled in the art of such installations will typically have the needed fittings or sections of water line, as may be required.

After the water shutoff valve 10 has been installed in the cold water supply line 64B, it is necessary to run a line from the air volume 68 above the level of the water in the hot water tank to the port 22 located in the upper housing 12 of the shutoff valve 10. For many installations, the most convenient way to accomplish this is to tap into the existing vent line from air volume 68 to the pressure relief valve 70 of the hot water heater 60. This may be accomplished by installing a T-fitting in the vent line between the tank 62 and the pressure relief valve 70, as shown schematically in FIG. 4. A sensing line 74 is installed from the center port of the T-fitting to the port 22 in the chamber 20 of the shutoff valve 10. The sensing line 74 fluidly couples the chamber 20 of the shutoff valve 10 to the air volume 68 of foe hot water tank 62 and thereby allows the chamber 20 to see or sense the air pressure in the air volume 68 of the hot water tank 62.

Operation of the Water Shutoff Valve

The following description is made with reference to FIGS. 1-4 and assumes the water shutoff valve 10 of the present invention is installed and tor use with a tank-style hot water heater as shown in FIG. 4. The water shutoff valve 10 of the present invention is a normally closed valve. That is, in the absence of external air pressure applied to the port 22 of the chamber 20, the biasing spring 54 drives the piston 18 and the shutoff plunger 26 downwardly until the shutoff plunger 26 is seated in the plunger seat 24 of the tower housing 14. (See FIG. 2.) When seated in the plunger seat 24, the shutoff plunger blocks the flow passage 38 and thereby prevents water from flowing through the shutoff valve 10. The shutoff valve 10 is in, or reverts to, the closed position when the hot water heater 60 is cold or when (the tank 60 has ruptured or has otherwise suffered a substantial pressure loss.

From a cold start, as water in the tank 62 is heated, air pressure increases in the internal air volume 68 shove the level of water in the tank. The chamber 20 of the shutoff valve 10 sees or senses this increasing air pressure by means of the sensing line 74 which couples the chamber 20 to the air pressure in the tank 62, or more specifically to that of the air volume 68 of the tank. As the water temperature rises to its preset steady state temperature and thus pressure in the tank 62 rises to its steady state operating pressure or a first predetermined pressure, the piston 18 moves upwardly in the piston bore 40 and overcomes the downwardly directed force of the biasing spring 54 thereby lifting the shutoff plunger 26 off the plunger seat 24, which opens the flow passage 38 to water flow from the cold water supply line 64B.

At the first predetermined pressure, i.e. normal operating pressure corresponding to the water in the tank 62 being heated to its preset steady state temperature, the piston 18 rises and compresses the biasing spring sufficiently far to lift the shutoff plunger 26 into the plunger bore 42 in the upper housing 12, thus fully opening the shutoff valve 10. (See FIG. 2.)

As described, the shutoff valve 10 is responsive to changes in air pressure. When the pressure in the hot water tank fails below a second predetermined pressure, lower than the first predetermined pressure, the shutoff valve will close. That is, when the air pressure in the tank 62 falls below a second predetermined pressure, the fence of the biasing spring 54 overcomes the applied air pressure and drives the piston 18 and the shutoff plunger connected thereto, downwardly, so that the shutoff plunger 26 blocks fluid flow in the flow passage. 38.

In the event of a rapture in the hot water tank 62, air pressure in the tank will drop precipitously below the second predetermined pressure and the shutoff valve 10 will rapidly close. That is, in the event of a sudden loss of air pressure in the hot water tank 62, which typically corresponds to a tank rupture, the biasing spring 54 will drive the piston 18 and consequently the shutoff plunger 26 downwardly, until the plunger 26 is again seated in plunger seat 24, and thereby shuts off the flow of cold water through the shutoff valve 10.

Any significant leak in the hot water tank 62 whether caused by a tank rupture, broken drain line, failed fitting or the like, will cause tank pressure to drop and thereby the shutoff valve 10 will actuate and shutoff the inlet flow of cold water. In the vent the hot water heater 60 is turned off, as the water in the tank slowly coots, the air pressure in the tank will drop and the shut off valve 10 will close. The shutoff valve 10 will also shut off the inlet water flow when the hot water heater is drained or in the event of a heat source failure.

In the event of a planned shutoff of the hot water heater 62 or an inadvertent shutoff which does not compromise the hot water tank's integrity, for example due to a power failure in the case of electric hot water heater, when the hot water heater restarts, the shutoff valve 10 may be manually opened via the reset lever 32 connected to the upper end 46 of the operating rod 30. Alternatively, if the shutoff valve 10 is not reset, the valve 10 will reopen automatically as water in the tank heats up and air pressure in the tank correspondingly rises.

It should be noted that the reset lever 32 has a first end 76 and a second end 78. The reset lever 32 features a flat surface 82, a contoured surface 84 and sliding surface 80. Due to the contoured shape of the lever 32, the second end 78 of the lever is heavier than the first end 76. The reset lever 32 and the operating rod 30 are configured such that the reset lever 32 is lifted clear of the cap 16 when the shutoff valve 10 is in the open condition, (see FIG. 1.) The shutoff valve 10 being in the open condition corresponds to the hot water heater 60 being at is preset operating temperature.

In open condition, due to the weight differential between the first end 76 and the second end 78 of the reset lever 32, the second end 78 rests below the pivot pin 86 and relatively close to the cap 16. (See FIG. 1.) In the event of a shutoff event, as the tank 62 loses pressure, the curved sliding surface 80 of the reset lever 32 is the first part of the lever to contact the cap 16 as the biasing spring 34 drives the piston 18 and consequently the reset lever downwards. As such the curved surface 80 biases the reset lever 32 such that the flat surface 82 comes to rest on the top of the cap 16, which allows the shutoff plunger 26 to fully seat on the plunger seat 24 and shutoff water flow through the flow passage 38 of the shutoff valve. (See FIG. 2.)

With reference to FIG. 3, the shutoff valve 10 may be reset by manually rotating or Hipping the reset leva 32 such that the contoured surface 84 rests against the top of cap 16. In this positron, the shutoff plunger is lifted of the plunger seat 24 to allow for water to again flow through the flow passage 38 of the shutoff valve.

As may be seen, a water shutoff valve well-suited for use with common tank-style hot water heaters has been presented. The shutoff is responsive GO hot water heater tank pressure and acts to shut off the flow of cold water to a hot water heater in any instance of a pressure loss, such as may occur during a hot water tank rupture. As such, the shutoff valve 10 of the present invention has the potential to prevent water damage to homes or commercial buildings that would otherwise be caused if the flow of cold water through a ruptured hearer is not quickly stopped. Given the large number of hot water heaters that likely rapture in any given year, it may be appreciated that there is a large potential for water conservation through widespread use of the valve.

While the present invention has been described with regards to particular embodiments, it is recognized that additional variations of the present invention may be devised without departing from the inventive concept.

What is claimed is:

1. A shutoff valve (10) for use with a container (62), the shutoff valve (10) comprising:

a housing (12, 14) having an inlet (34) operatively connected to a source of pressurized fluid (64B) and an outlet (36) operatively connected to the container (62), the outlet (36) having a valve seat (24);

a valve member (26) moveable to a first position in which the valve member (26) sealingly engages the valve seat (24) to prevent a flow of fluid through the outlet (36), the valve member (26) further moveable to a second position in which the valve member (26) disengages the valve seat (24) to allow a flow of fluid through the outlet (36);

a bias spring (54) urging the valve member (26) to the first position;

a piston (18) operatively attached to the valve member (26), the piston (18) being disposed in a chamber (20), the chamber (20) being in fluid communication with the outlet (36) such that the pressure in chamber (20) is equal to the pressure in outlet (36), the piston (18) operating to oppose the bias spring (54) such that pressure in chamber (20) produces a force that urges valve member (26) to the second position, whereby falling pressure in outlet (36) causes the pressure in chamber (20) to fall by an equal amount thereby allowing bias spring (54) to overcome the force urging valve member (26) to the second position, thus allowing valve member (26) to move to the first position, preventing the flow of fluid through the outlet (36) into container (62); and a reset lever (32) operably attached to the valve member (26), the reset lever (32) being movable to an engaged position, in which the reset lever (32) moves the valve member (26) to the second position, the reset lever (32) further movable to a disengaged position in which the reset lever (32) allows the valve member (26) to be moved to the first position.

2. The shutoff valve (10) of claim 1, wherein:
the valve member (26) comprises a plunger disposed at a first end of an operating rod (30).

3. The shutoff valve (12) of claim 2, wherein:
a second end of the operating rod (30) extends outside of the housing.

4. The shutoff valve (12) of claim 3, wherein:
the reset lever (32) comprises a lever member pivotally attached to the second end of the operating rod (30), the lever member having a curved sliding surface (80) that engages the housing (12) to move the valve member (26) to the second position.

5. The shutoff valve (12) of claim 4, wherein:
the bias spring (54) directly engages the piston (18).

6. The shutoff valve (12) of claim 2, wherein:
the bias spring (54) is retained by a cap (16) having an aperture through which operating rod (30) extends.

7. The shutoff valve (12) of claim 6, wherein:
the chamber (20) is in fluid communication with outlet (36) via a sensing port (22) disposed in a proximal end of chamber (20), the bias spring (54) being disposed at a distal end of chamber (20).

8. The shutoff valve (12) of claim 7, wherein:
the container (62) is a component of a residential water heater (60).

* * * * *